United States Patent
Höhne et al.

(10) Patent No.: US 11,212,739 B2
(45) Date of Patent: Dec. 28, 2021

(54) ESTABLISHING TETHERING CELLS REMOTELY

(71) Applicant: NOKIA TECHNOLOGIES OY, Espoo (FI)

(72) Inventors: Hans Thomas Höhne, Helsinki (FI); Lianghai Ji, Aalborg (DK); Anja Jerichow, Grafing bei München (DE); Ling Yu, Kauniainen (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/931,814

(22) Filed: Jul. 17, 2020

(65) Prior Publication Data

US 2021/0029622 A1    Jan. 28, 2021

(30) Foreign Application Priority Data

Jul. 26, 2019  (FI) .................................... 20195652

(51) Int. Cl.
| | | |
|---|---|---|
| *H04L 12/28* | (2006.01) | |
| *H04W 48/16* | (2009.01) | |
| *H04W 76/14* | (2018.01) | |
| *H04W 8/24* | (2009.01) | |
| *H04W 48/20* | (2009.01) | |

(Continued)

(52) U.S. Cl.
CPC ............ *H04W 48/16* (2013.01); *H04W 8/24* (2013.01); *H04W 48/20* (2013.01); *H04W 76/14* (2018.02); *H04W 88/04* (2013.01)

(58) Field of Classification Search
CPC ....... H04W 48/20; H04W 4/80; H04W 88/04; H04W 8/005; H04W 48/16; H04W 84/12
USPC .......................................... 370/252, 329, 386
See application file for complete search history.

(56) References Cited

U.S. PATENT DOCUMENTS

| 9,066,197 B2 | 6/2015 | Kiukkonen et al. |
| 9,392,067 B2 | 7/2016 | Anders et al. |
| 9,936,528 B2 | 4/2018 | Adib et al. |

(Continued)

FOREIGN PATENT DOCUMENTS

| EP | 3 343 962 A1 | 7/2018 |
| WO | 2014/070433 A1 | 5/2014 |
| WO | WO 2017/223227 A1 | 12/2017 |

OTHER PUBLICATIONS

Office Action dated Nov. 12, 2019 corresponding to Finnish Patent Application No. 20195652.

(Continued)

*Primary Examiner* — John Pezzlo
(74) *Attorney, Agent, or Firm* — Squire Patton Boggs (US) LLP

(57) ABSTRACT

According to an aspect, there is provided a terminal device comprising means for performing the following. The terminal device transmits a tethering request for setting up a tethering cell over at least one communications network to at least one tethering terminal device capable of setting up a tethering cell. Then, the terminal device performs tethering cell discovery for discovering tethering cells set up by any of said at least one tethering terminal device. In response to discovering a tethering cell provided by a tethering terminal device of said at least one tethering terminal device, the terminal device accesses the tethering cell.

19 Claims, 7 Drawing Sheets

(51) Int. Cl.
    *H04W 88/04*     (2009.01)
    *H04J 1/16*     (2006.01)

(56) References Cited

U.S. PATENT DOCUMENTS

| | | |
|---|---|---|
| 9,980,304 B2 | 5/2018 | Huang et al. |
| 2013/0254264 A1* | 9/2013 | Hankinson ........ H04L 29/06047 |
| | | 709/203 |
| 2015/0351004 A1 | 12/2015 | Ko et al. |
| 2017/0169418 A1* | 6/2017 | Bellenger ............ G06Q 20/322 |
| 2017/0295600 A1* | 10/2017 | Hassan ............... H04L 67/1063 |
| 2018/0279199 A1 | 9/2018 | Karakkad Kesavan Namboodiri et al. |
| 2018/0359369 A1* | 12/2018 | Golshenas .......... H04L 12/1403 |
| 2020/0413342 A1* | 12/2020 | Lee ......................... H04W 4/80 |

OTHER PUBLICATIONS

Communication of Acceptance under section 29a of Patents Decree dated Mar. 13, 2020 corresponding to Finnish Patent Application No. 20195652.

European Search Report dated Oct. 19, 2020 corresponding to European Patent Application No. 20187128.2.

* cited by examiner

ESTABLISHING TETHERING CELLS REMOTELY

FIELD OF THE INVENTION

Various example embodiments relate generally to wireless communications, and more particularly to tethering.

BACKGROUND ART

The following description of background art may include insights, discoveries, understandings or disclosures, or associations together with disclosures not known to the relevant art prior to the present invention but provided by the invention. Some such contributions of the invention may be specifically pointed out below, whereas other such contributions of the invention will be apparent from their context.

Tethering is a technique in which a computing device provides Internet access to another computing device. Tethering differs from relaying in that the tethering device (i.e., the device providing tethering) cannot be controlled by the computing device for which the tethering is provided and in that the tethering device may not extend the services of an operator or private network. Rather, the tethering device provides a local service, namely Internet access, to other computing devices in the vicinity. Conventionally, tethering functionality requires the tethering capable device to periodically send broadcast messages so as to enable discovery. The broadcast messaging needs to be carried out constantly even if during long stretches of time no terminal devices are located within the tethering range of the broadcasting terminal device. Thus, there is a need for a more efficient and expedient tethering solutions.

WO 2017223227 A1 discloses a device which is programmed with an application to share bandwidth to and from multiple sources. In one embodiment, there is provided a mobile device with a computer running a controlling program for operating functions of the mobile device and an application that controls sharing of bandwidth from the mobile device, and obtaining shared bandwidth from another mobile or land-based device.

SUMMARY

According to an aspect, there is provided the subject matter of the independent claims. Embodiments are defined in the dependent claims. The scope of protection sought for various embodiments of the invention is set out by the independent claims.

The embodiments and features, if any, described in this specification that do not fall under the scope of the independent claims are to be interpreted as examples useful for understanding various embodiments of the invention.

BRIEF DESCRIPTION OF THE DRAWINGS

In the following, some example embodiments will be described with reference to the accompanying drawings, in which.

DETAILED DESCRIPTION OF SOME EMBODIMENTS

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
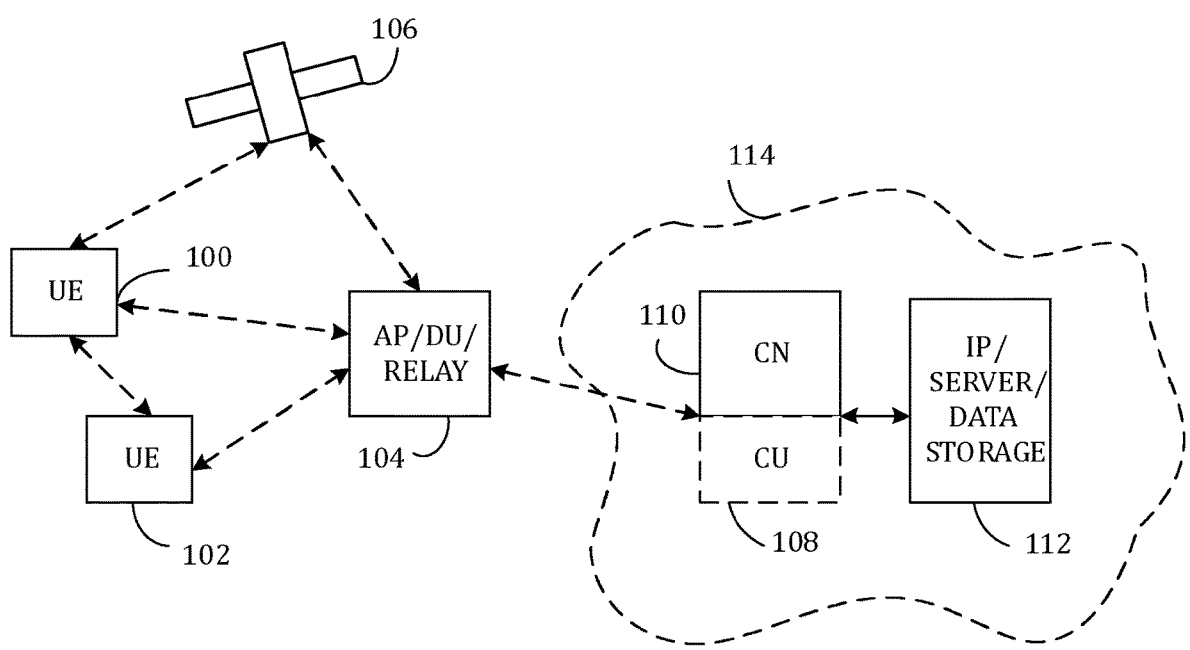
FIG. 1 illustrates an example of communications systems to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 (equally called terminal devices) configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signalling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal or terminal device) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

It should be understood that, in FIG. 1, user devices are depicted to include 2 antennas only for the sake of clarity. The number of reception and/or transmission antennas may naturally vary according to a current implementation.

Additionally, although the apparatuses have been depicted as single entities, different units, processors and/or memory units (not all shown in FIG. 1) may be implemented.

5G enables using multiple input—multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications, including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

5G may also utilize unlicensed spectrum, similar to WLAN or Multefire. 5G operating in unlicensed spectrum is also referred to as NR-U.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs or may be a Home (e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)NodeBs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

The embodiments to be discussed below relate specifically to enabling tethering between terminal devices in a wireless communications system such as the system illustrated in FIG. 1. Tethering is a technique in which a device provides Internet access (or additionally or alternatively access to one or more other networks) to another device. For instance, a terminal device (i.e., UE) or a dongle may set up a WLAN access point to which other WLAN stations (STAs) may tether. At least some of the embodiments may be implemented specifically using unlicensed spectrum as the use of unlicensed spectrum (as opposed to licensed spectrum) enables setting up temporary (ad-hoc) cells without having to first acquire a license for the spectrum used. Conventionally, when a terminal device would like to use tethering (e.g., in a roaming scenario where its network access is limited), the terminal device has to discover nearby terminal devices that are capable of providing tethering. To enable the tethering discovery, the tethering terminal device (i.e., the terminal device providing tethering) needs to be constantly transmitting periodic broadcast messages. Due to the continuous nature of the periodic broadcasting which does not take into account whether any terminal devices are within or even near the tethering range, a large number of the transmitted broadcast messages may be redundant (that is, said messages are not received by any terminal device and thus unused). Said redundant broadcast message, thus, increase the power consumption of the tethering terminal device, create unnecessary interferences and/or limit the performance (e.g., processing speed) of the tethering terminal device in terms of other services. The embodiments to be discussed below seek to overcome or at least alleviate at least some of said problems.

In the following, the term "tethering terminal device" is used to mean a terminal device capable of providing tethering (i.e., configured for providing tethering). The term "tethering terminal device" does not imply necessarily that said terminal device currently has set up a tethering cell (e.g., a WLAN hotspot) or that said terminal device is currently in a state where setting up a tethering cell is feasible (e.g., taking into account a current charge of the battery of the terminal device).

Figure 2:
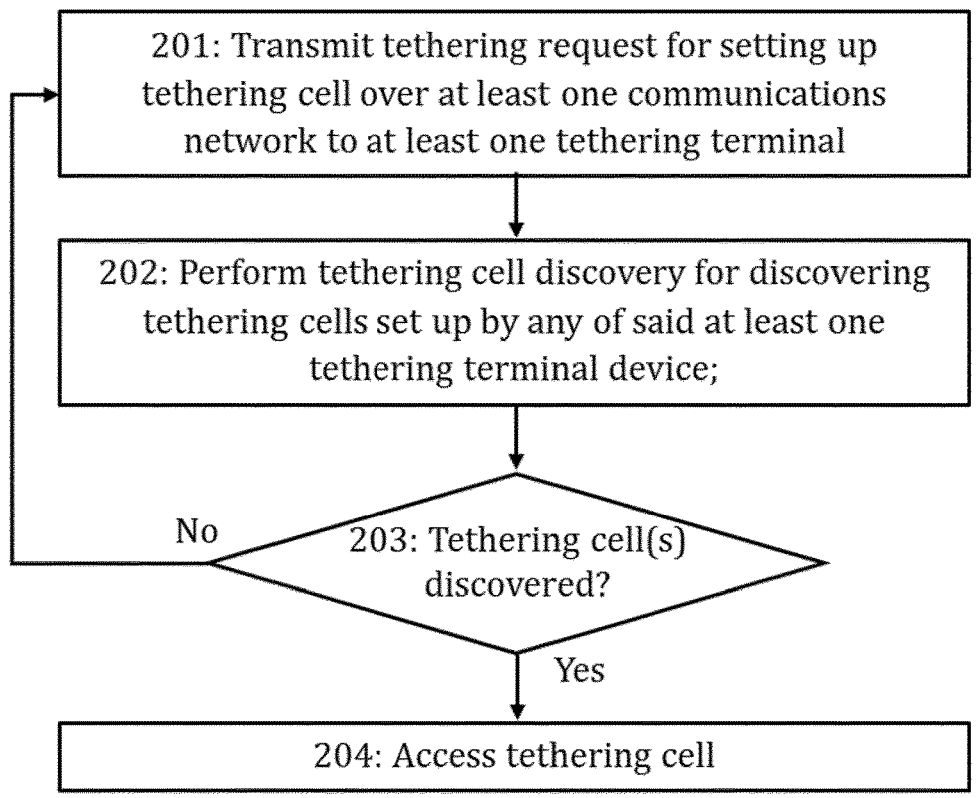
FIGS. 2 to 7 illustrate examples of processes according to embodiments.

FIG. 2 illustrates an exemplary process according to embodiments performed by a terminal device for establishing a tethering connection to a (tethering) terminal device capable of providing tethering. In other words, the terminal device carrying out the process of FIG. 2 is a terminal device desiring to employ tethering, e.g., to access Internet. Said terminal device may or may not be capable of providing tethering service itself to other terminal devices. The terminal device carrying out the process of FIG. 2 may be, for example, either of the terminal devices 100, 102 of FIG. 1.

Referring to FIG. 2, a terminal device transmits, in block 201, a tethering request for setting up a tethering cell over at least one communications network to at least one tethering terminal device capable of setting up a tethering cell. Said at least one communications network may comprise one or more wired communications networks and/or one or more wireless communications networks. Said at least one communications network may comprise one or more cellular networks (e.g., 3G, 4G and/or 5G) and/or the Internet. The tethering request may be transmitted specifically as a short message service (SMS) message, as an e-mail or as a message of a dedicated messaging application or service. The dedicated messaging application or service may be, for example, WhatsApp, WeChat, QQ Messenger, Viber, Line, Snapchat, KakaoTalk, Hangouts, Blackberry Messenger, Telegram, Zalo, Slack and Facebook Messenger. The message of the dedicated messaging application or service may be specifically a direct message (i.e., a private message to a user of the tethering terminal device). The tethering request may comprise at least information on a current location of the terminal device. Additionally or alternatively, the tethering request may comprise configuration information which may be information required for setting up a tethering cell or at least for facilitating setting up of the tethering cell. The current location of the terminal device may be included in said configuration information. The configuration information may, also or alternatively, comprise, for example, a time stamp (i.e., information on current time), an identifier for the tethering request and information on the specifications and/or configuration of the terminal device.

To enable the transmitting in block 201, the terminal device may maintain, in a memory of the terminal device, information on a first set of one or more tethering terminal devices capable of setting up a tethering cell. Said first set of one or more terminal device may correspond to a set of tethering terminal devices received from a network node (e.g., from an access node, a network node in a core network or a remote database such as an Internet database). Said first set of tethering terminal devices compiled by the network node may comprise tethering terminal devices which are known to accept tethering if the terminal device requesting tethering is within tethering range and/or if the current state of the tethering terminal device (e.g., current charge of the battery) allows for tethering. Said first set of tethering terminal devices may be defined (in the network node) based on a current location of the terminal device (e.g., it may be contain tethering terminal devices within a pre-defined distance from the requesting terminal device). The current location of the terminal device may correspond, here, specifically to an area defined by a connected cell for a terminal device in connected mode, a RAN notification area for a terminal device in inactive mode, a camped tracking area for a terminal device in idle mode or a Global Positioning System (GPS) location reported by the terminal device to the network node. In some embodiments, the terminal device may specifically request the list of tethering terminal devices (i.e., the first set) by transmitting a request (possibly comprising information such as a location of the terminal device) to the network node via a (wireless) communications network. Upon receiving said request, the network node configures or provisions the list of one or more tethering terminal devices for the terminal device (i.e., sends a configuration or provisioning message comprising information on the first set of one or more tethering terminal devices), e.g., based on the current location of the terminal device. The information on the first set may comprise, for each tethering terminal device in the first set, at least contact information enabling the terminal device to communicate with said tethering terminal device. Said contact information may comprise one or more of a phone number of a tethering terminal device, an identifier of the tethering terminal device comprising the phone number and an e-mail address associated with the tethering terminal device. In some embodiments, the contact information may further comprise possibly a name and/or other identifier of a user of the tethering terminal device. In some embodiments, the contact information for the first set received from a network node may comprise an identifier, an address or an access token of a web service provided by the network node.

Alternatively or additionally, the terminal device may maintain in the memory of the terminal device, information on a second set of one or more tethering terminal devices which are not only capable of tethering but also configured to accept tethering requests specifically from said terminal device. This second set of tethering terminal devices may correspond to tethering terminal devices users of which the user of said terminal device requesting tethering knows personally (e.g., terminal devices of family members, friends, co-workers and/or other personal contacts). The user of the terminal device may have exchanged contact details (e.g., a phone number and/or an e-mail address) with said personal contacts and each of said personal contacts may have configured their (tethering-capable) terminal devices to accept requests to establish tethering for the terminal device. The information on the second set may comprise, for each tethering terminal device in the second set, at least contact information enabling the terminal device to communicate with said tethering terminal device. Said contact information may comprise one or more of a phone number of a tethering terminal device, an identifier of the tethering terminal device comprising the phone number and an e-mail address associated with the tethering terminal device. In some embodiments, the contact information for the second set may further comprise possibly a name and/or other identifier of a user of the tethering terminal device.

In some embodiments, the information on the first set and/or the second set may comprise, at least for some of the tethering terminal devices in the corresponding set, tethering capability information of tethering terminal devices. The tethering capability information and how it may be used for comparing different tethering terminal devices is discussed in detail in relation to further embodiments.

Said at least one tethering terminal device to which the tethering request is transmitted, in block 201, may be selected, fully or at least in part, from the one or more tethering terminal devices in the first set (if one is defined) and/or the second set (if one is defined).

In some embodiments, the terminal device may maintain, in the memory of the terminal device, location-specific tethering history information regarding tethering between any tethering terminal devices (which may be included in the first set and/or the second set) and the terminal device. The terminal device may select said at least one tethering terminal device to which the tethering request is transmitted based at least on the location-specific tethering history information and a current location of the terminal device (acquired, e.g., using GPS). For example, the terminal device may transmit the tethering request only to a subset of tethering terminal devices in the second set (or in the first set) based on the location-specific tethering history information. Said subset may specifically comprise (only) tethering terminal devices with which the terminal device has established tethering connection previously near the current location of the terminal device.

After the tethering request(s) has been transmitted in block 201, the terminal device performs, in block 202, tethering cell discovery for discovering tethering cells set up by any of said at least one tethering terminal device (in response to the transmitted tethering request). The tethering cell discovery may comprise monitoring messages by the terminal device so as to detect messages associated with tethering cells (i.e., tethering offers).

In response to discovering a tethering cell provided by a tethering terminal device of said at least one terminal device in block 203, the terminal device accesses, in block 204, the tethering cell. The tethering cell may provide the terminal device access, for example, to the Internet and/or other networks. In other embodiments, in response to discovering at least one tethering cell provided by at least one of said at least one terminal device in block 203, the terminal device accesses, in block 204, one of said at least one tethering cell.

In response to failing to discover any tethering cells provided by any tethering terminal devices of said at least one terminal device in block 203, the terminal device may repeat the transmission of the (same) tethering request in block 201. In other embodiments, no retransmission of the tethering request may occur in response to a failure to detect any tethering cell in block 203. In such cases, the repetition of block 201 in FIG. 2 may correspond simply to a transmission of another tethering request for setting up another tethering cell over said at least one communications network to at least one tethering terminal device at some point in the future.

Figure 3:
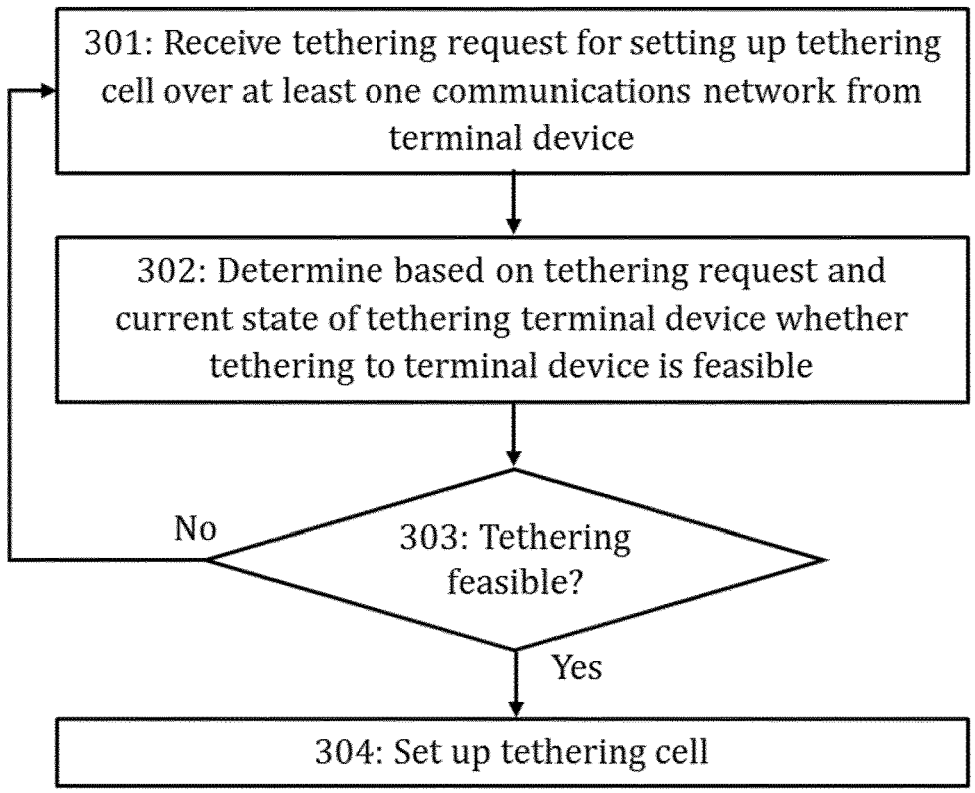

FIG. 3 illustrates an exemplary process according to embodiments performed by a tethering terminal device for setting up a tethering cell based on a tethering request. The process of FIG. 3 may correspond to a process carried out by a tethering terminal device in response to a terminal device carrying out the process of FIG. 2. The terminal device carrying out the process of FIG. 3 may be, for example, either of the terminal devices 100, 102 of FIG. 1.

Referring to FIG. 3, a tethering terminal device (i.e., a terminal device capable of providing tethering) initially receives a tethering request over at least one communications network from a terminal device. Said at least one communications network may be defined as discussed in relation to FIG. 2. Also as discussed above in relation to FIG. 2, the tethering request may be transmitted as an SMS message, as an e-mail or a message of a dedicated messaging application or service. Further, the tethering request may comprise any information described in relation to block 201 of FIG. 1 (e.g., information on a current location of the terminal device and/or configuration information).

In response to the receiving of the tethering request in block 301, the tethering terminal device determines, in block 302, based at least on the tethering request (i.e., information comprised therein such as a current location of the requesting terminal device) and a current state of the tethering terminal device whether tethering of the terminal device to the tethering terminal device is feasible (or viable). The term "feasible" means here that providing tethering is not only possible but the tethering can be provided with a sufficiently high level of service (e.g., signal-to-noise ratio or bit rate) without placing undue burden on the tethering device (e.g., quickly draining the battery so as to cause a shutdown of the tethering terminal device). The feasibility may be determined by comparing information comprised in the tethering request and/or the current state of the tethering terminal device against pre-defined criteria (e.g., one or more pre-defined thresholds for one or more different quantities or metrics). The current state of the tethering terminal device may comprise, for example, information on one or more of the following: a current charge of a battery of the tethering terminal device, a current processing load of the tethering terminal device, tethering status of the terminal device (e.g., whether or not the tethering terminal device is currently providing tethering to other terminal devices) and current configuration of the tethering terminal device (e.g., whether or not the tethering terminal device is currently configured to allow providing tethering).

In some embodiments, the determining of the feasibility in block 302 may comprise determining whether a current charge of a battery of the tethering terminal device allows for tethering. This determining may be based on comparing a current charge of the terminal device against a pre-defined threshold defining the minimum charge of the battery of the tethering terminal device allowing for tethering. If the current charge of the battery exceeds the pre-defined threshold, the tethering terminal device may consider tethering to be feasible for said tethering terminal device. In other embodiments, one or more other checks (e.g., the location check discussed in the following paragraph) need also to be passed in order for the tethering terminal device to be considered feasible for tethering. The pre-defined threshold may be given, for example, as a percent value indicating a charge relative to a maximum charge of the tethering terminal device. Information on the pre-defined threshold may be maintained in the memory of the tethering terminal device.

In some embodiments, the determining of the feasibility in block 302 may comprise determining whether a current location of the terminal device is within a pre-defined tethering range from a location of the tethering terminal device. If the current location of the terminal device is within the pre-defined tethering range, the tethering terminal device may consider tethering to be feasible (at least in terms of the location of the tethering terminal device relative to the requesting terminal device). In such embodiments, it is assumed that the tethering request comprises at least information on the current location of the (requesting) terminal device or said information is acquired by the tethering terminal device through other means (e.g., from a network node such as an access node or a remote database). The tethering terminal device may determine its own location, for example, using the Global Positioning System (GPS). Information on the pre-defined tethering range may be maintained in the memory of the tethering terminal device.

In some embodiments, the determining of the feasibility in block 302 may comprise determining whether the tethering terminal device is currently being charged using a power supply. If the tethering terminal device is currently being charged using a power supply, the tethering terminal device may consider tethering to be feasible.

In some embodiments, the determining of the feasibility in block 302 comprises two or more of the checks described above (i.e., checks regarding the battery power level of the tethering terminal device and a relative location of the tethering terminal device) and possibly one or more further checks based on information comprising the tethering request and/or the state of the tethering terminal device. If multiple checks are carried out, all of said multiple checks must be passed in order for the tethering to be considered feasible using said tethering terminal device. To give a practical example, the current charge of the tethering terminal device may be required to be above 10% and the tethering terminal device may be required to be within 6 meters of the requesting terminal device. In some embodiments, if it is determined that the tethering terminal device is currently being charged, the check concerning the current charge of the battery may be skipped (i.e., the current charge of the battery may have no effect on the feasibility assessment).

In response to determining that providing tethering to the terminal device is feasible in block 303, the tethering terminal device sets up, in block 304, a tethering cell accessible by the terminal device. In embodiments where the tethering request received in block 301 comprises configuration information for setting up a tethering cell, said setting up of the tethering cell in block 304 may be performed according to the configuration information. The tethering cell may correspond to a WLAN hotspot (also known as a personal or mobile hotspot). In some embodiments, the tethering cell may employ unlicensed spectrum, as described above. In some embodiments, the tethering cell may be a NR-U cell or a MulteFire cell. Upon setting up the tethering cell in block 304, the tethering terminal device may transmit (or specifically broadcast) tethering offers which may be detected by the (requesting) terminal device. The tethering offer may be broadcast in the form of or part of a cell-defining SSB (NR-U), as part of system information (NR-U), or as a beacon or part of a beacon (WLAN).

In response to determining that providing tethering to the terminal device is not feasible in block 303, the tethering terminal device does not set up any tethering cells. Instead, the process may proceed back to block 301. In other words, after some time has passed, the tethering terminal device may receive, in block 301, another tethering request from the same or different terminal device as before and the processes of blocks 301, 302, 303 and potentially block 304 may be carried out for that new tethering request.

Figure 4:
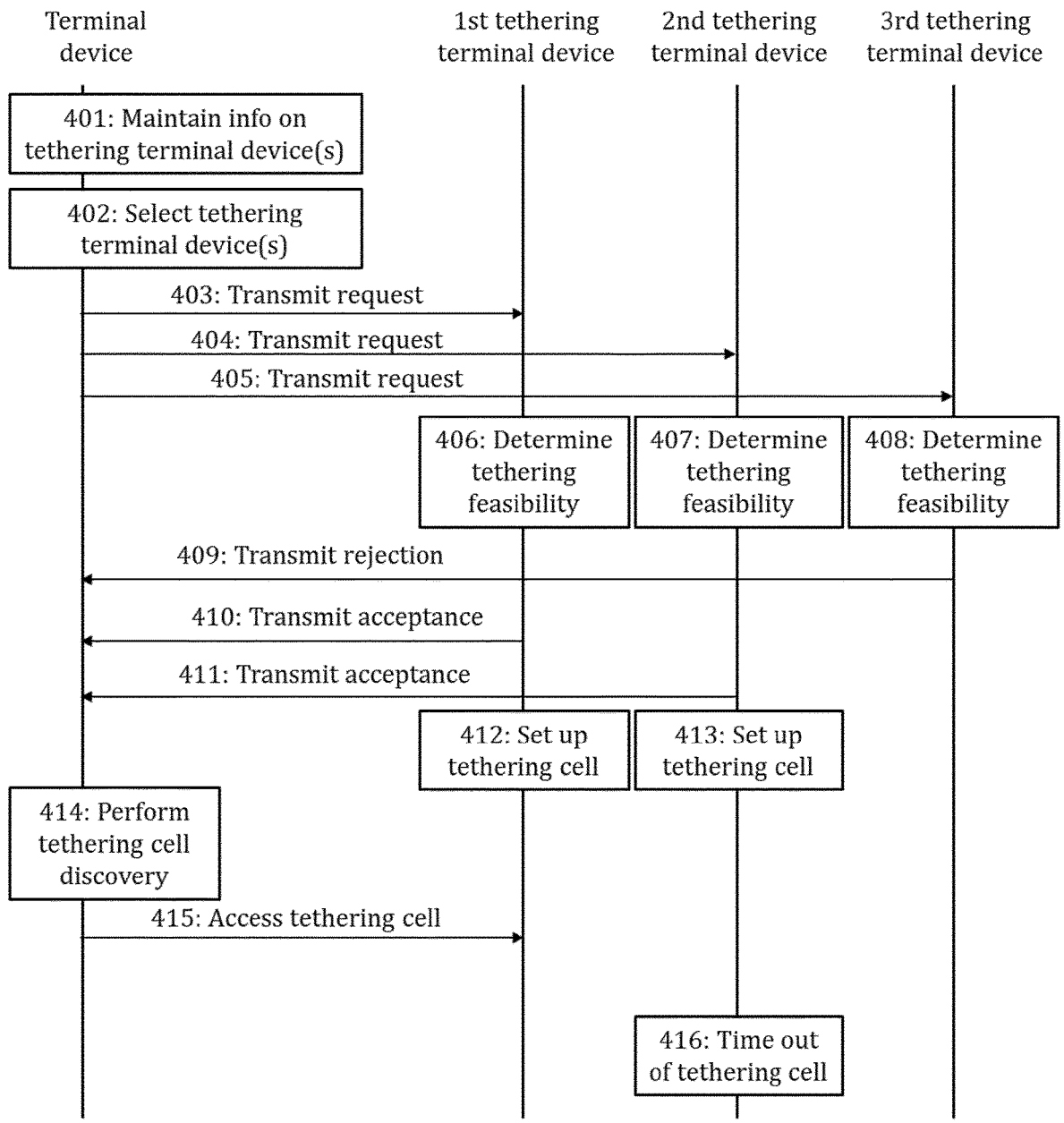

FIG. 4 shows a signalling diagram illustrating a process for organizing tethering for a terminal device according to embodiments. FIG. 4 illustrates specifically an exemplary scenario where a terminal device requests tethering from three tethering terminal devices (named first, second and third tethering terminal devices). The features described in relation to FIG. 4 may be applied equally to other tethering scenarios (i.e., tethering scenarios with any number of available tethering terminal devices). The terminal devices depicted in FIG. 4 may correspond to either of terminal devices 100, 102 of FIG. 1.

The processes illustrated in FIG. 4 correspond for the most part to the embodiments discussed above in relation to FIGS. 2 and 3. Unless otherwise stated, any of the functionalities described for the above embodiments are applicable also for the processes of FIG. 4. In the following discussion, an emphasis is thus placed on the features not discussed in relation to FIGS. 2 and 3.

Referring to FIG. 4, a terminal device initially maintains, in a memory of the terminal device, in block 401, information on one or more tethering terminal devices (i.e., terminal devices capable of providing tethering). Specifically, the terminal device may maintain, in block 401, information on a first set of one or more tethering terminal devices known to be capable of providing tethering and/or information on a second set of one or more tethering terminal devices known to be capable of providing tethering as well as being configured to allow tethering for said terminal device (e.g., corresponding to personal contacts of a user of the terminal device), as described in relation to FIG. 2. Alternatively or additionally, the terminal device may maintain, in block 401, the location-specific tethering history information for one or more tethering terminal devices (which may or may not be included in the first and/or second set), as also described in relation to FIG. 2.

FIG. 4 also illustrates as a separate block 402 the aforementioned feature of selecting at least one terminal device (i.e., at least one candidate tethering terminal device) for providing tethering. In other words, the terminal device selects, in block 402, at least one tethering terminal device from the one or more tethering terminal devices information on which is maintained in the memory of the terminal device. Specifically, said at least one terminal device may be selected in block 402 (at least in part) from the first set, from the second set or from the first and second sets. If both the first and second sets are defined, tethering terminal devices in the second set (i.e., personal contacts of a user of the terminal device) may be prioritized or preferred in the selecting. A pre-defined (maximum) limit for the number of tethering terminal devices selected in block 402 may be set. If location-specific tethering history information regarding previous tethering between any tethering terminal devices and the terminal device is maintained in the memory of the terminal device, the selecting in block 402 may be carried out based at least on the location-specific tethering history information and a current location of the terminal device. For example, if in the past tethering of the terminal device when it is located near its current location has been, in most cases, arranged via a particular tethering terminal device, at least said particular tethering terminal device may be selected in block 402. In the illustrated example, a first tethering terminal device, a second tethering terminal device and a third tethering terminal device are selected in block 402.

Similar to as discussed in relation to FIGS. 2 and 3, the terminal device transmits, in messages 403, 404, 405, a tethering request to each of the first, second and third tethering terminal devices over at least one communications network. The tethering requests may be transmitted using any means discussed in relation to block 201 of FIG. 2 (e.g., as SMS messages). Each of the first, second and third tethering terminal devices receives the tethering request (receiving steps are not explicitly denoted in FIG. 4 for simplicity). Then, each of the first, second and third tethering terminal devices determines, in blocks 406, 407, 408, whether tethering the terminal device is feasible. This determining may be carried out as described in relation to FIG. 3 (e.g., based on whether power situation allows tethering, whether the terminal device is within the pre-defined tethering range and/or whether configuration of the tethering terminal device allows for tethering). In the illustrated example, the third tethering terminal device determines, in block 408, that tethering the terminal device to the third terminal device is not feasible and consequently transmits, in message 409, a rejection message (e.g., a negative acknowledgment, NACK), to the terminal device over said at least one communications network. On the other hand, the first and second tethering terminal devices determine, respectively in blocks 406, 407, that providing tethering for the terminal device is feasible. Therefore, the first and second tethering terminal devices transmit, respectively in messages 410, 411, an acceptance message (e.g., a positive acknowledgment, ACK) to the terminal device over said at least one communications network. In other words, the first and second tethering terminal devices inform the terminal device (using the acceptance messages 410, 411, respectively) that they are accepting the tethering request and are going to set up tethering cells. Each of messages 409, 410, 411 may be transmitted using any means discussed in relation to block 201 of FIG. 2 for transmitting tethering requests.

The acceptance and rejection messages (e.g., messages 409, 410, 411) discussed in this application may be simple ACK and NACK messages comprising, respectively, an ACK bit set of one or more bits for indicating the acceptance of the request and a NACK bit set of one or more bits for indicating the rejection of the request (comprising no data payload regarding the tethering terminal cell or the tethering cell). In other embodiments, the acceptance and/or refusal messages may comprise, in addition to said ACK and NACK bit set or any corresponding bit or data set indicating acceptance/refusal, additional information (as data payload). Specifically, said additional information may comprise information characterizing the tethering terminal device and/or the tethering cell to be set up by the tethering terminal devices. Such embodiments are discussed in the following in detail.

In some embodiments, each of the acceptance messages 410, 411 may comprise tethering cell information that aids the terminal device in detecting (or discovering) the tethering cells that are going to be set up by the corresponding tethering terminal devices. This tethering cell information may comprise, for example, one or more radio parameters to be used for tethering such as a carrier frequency, a bandwidth and a cell identifier and/or information on how long the corresponding tethering cell is going to be active without the terminal device accessing it.

After transmitting the acceptance messages to the terminal device, the first and second tethering terminal devices set up, respectively in blocks 412, 413, a first tethering cell and a second tethering cell. The terminal device performs, in block 414, tethering cell discovery. Specifically, the tethering cell discovery may be carried out here using the tethering cell information received from the tethering terminal device (s) (in acceptance message 410, 411). In this example, the terminal device discovers the first tethering terminal device first (e.g., receives a tethering offer broadcast from the first tethering terminal device using the first tethering cell) and consequently accesses, in block 415 the first tethering cell. In other embodiments (as will discussed below in detail), the terminal device may analyze (or compare) the properties of the first and second tethering cells before accessing either of them so as select the best available tethering connection (e.g., in terms of bit rate, signal-to-noise ratio or dependability).

In response to a pre-defined (or configured) amount of time passing after the setting up of the second tethering cell without the terminal device accessing the second tethering cell, the second tethering terminal device terminates, in block 416, the tethering cell. In some embodiments, the second tethering terminal device may transmit, after the termination of the second tethering cell, information on the termination of the second tethering cell to the terminal device over said at least one communications network (e.g., as an SMS, an e-mail or a message of a dedicated messaging application or service).

Figure 5:
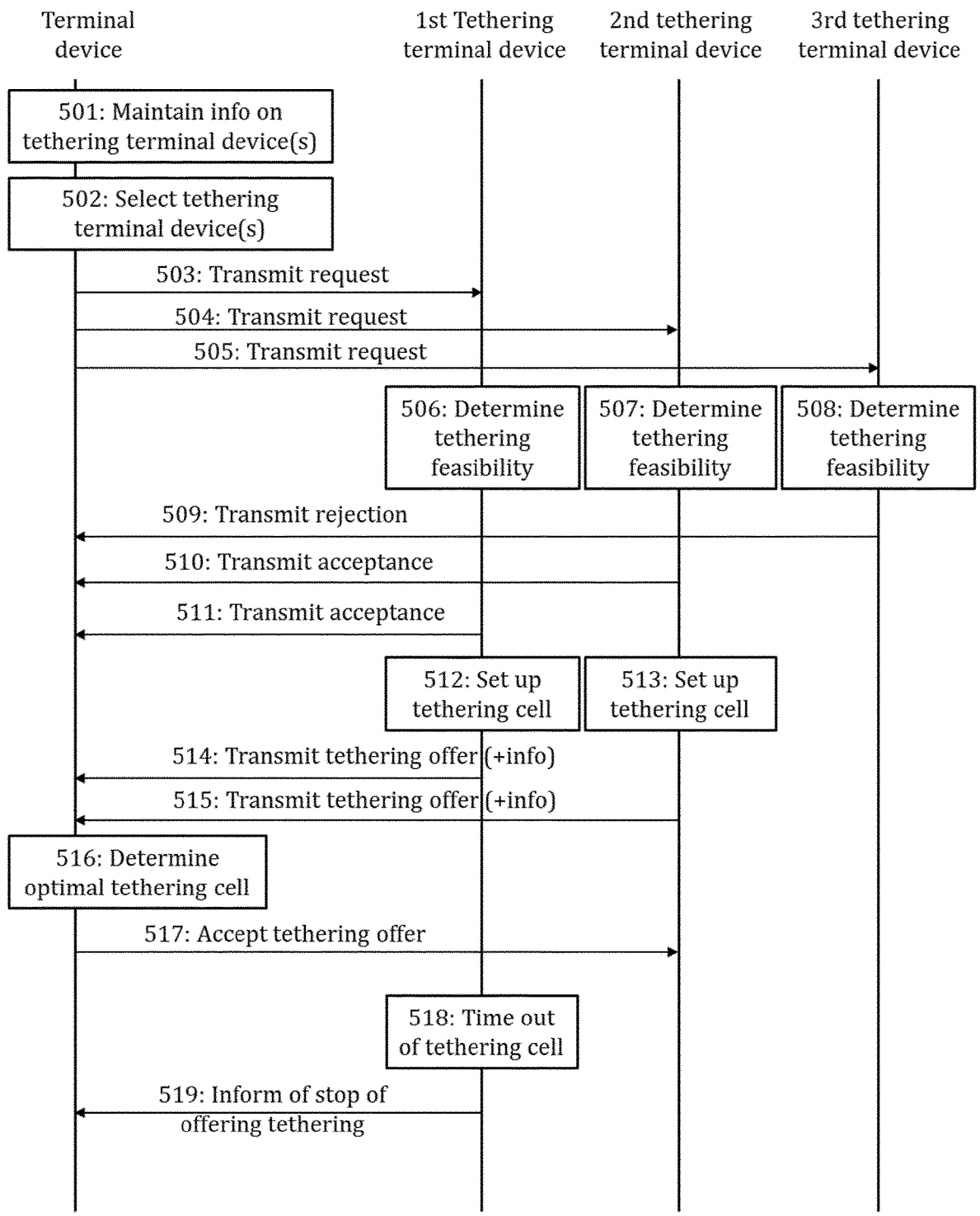

FIG. 5 shows an alternative signalling diagram illustrating a process for organizing tethering for a terminal device according to embodiments. FIG. 5 illustrates, similar to FIG. 4, an exemplary scenario where a terminal device requests tethering from three tethering terminal devices (named first, second and third tethering terminal devices). The features described in relation to FIG. 5 may be applied equally to other tethering scenarios (i.e., tethering scenarios with any number of available tethering terminal devices). The terminal devices depicted in FIG. 5 may correspond to either of terminal devices 100, 102 of FIG. 1.

The embodiment illustrated in FIG. 5 corresponds for the most part to the embodiment of FIG. 4. Namely, blocks 501 to 513 of FIG. 5 may correspond, respectively, to block 401 to 413 of FIG. 4 and are thus not discussed here in detail for brevity.

After the first and second tethering cells have been set up by the first and second tethering terminal devices (in blocks 512, 513), respectively, the first and second tethering terminal devices transmit, in messages 514, 515 respectively, tethering offers to the terminal device using the first and second tethering cells, respectively. Specifically, any of messages 514, 515 may be transmitted as broadcast messages (using a corresponding tethering cell). Moreover, any of messages 514, 515 may be transmitted periodically. Each tethering offer may comprise tethering capability information on a corresponding tethering terminal device. The tethering capability information of each tethering terminal device may comprise information on one or more of a current charge of a battery of a corresponding tethering terminal device (i.e., remaining battery life), a location of the corresponding tethering terminal device, the amount of credits that will be charged for the tethering service using said tethering terminal device, capability of the corresponding tethering terminal device (e.g., a model of the tethering terminal device, processing capability, current processing load and/or a speed of a provided connection) and current configuration of the tethering terminal device. Alternatively, messages 510 and 511 may contain the tethering capability information, as will be discussed in relation to messages 613 and 614 of FIG. 6. In some embodiments, a first part of the tethering capability information may be transmitted in messages 510, 511 and a second part of the tethering capability information may be transmitted in messages 514, 515. Upon receiving a tethering offer (e.g., messages 514, 515) or an acceptance message comprising tethering capability information of a tethering terminal device (e.g., messages 510, 511), the terminal device may store said tethering capability information to a memory of the terminal device.

In response to receiving tethering offers comprising tethering capability information of the first and second tethering terminal devices (or in general, of at least one of said at least one tethering terminal device to which the tethering request was transmitted) from the first and second tethering terminal devices (or in general from said at least one of said at least one tethering terminal device), the terminal device determines, in block 516, an optimal tethering terminal device for providing tethering for said terminal device from the first and second tethering terminal devices (or in general, from said at least one of said at least one tethering terminal device). Said determining may be carried out by comparing the tethering capability information (of different tethering terminal devices) based on pre-defined (or configured) criteria. The comparing based on the pre-defined (or configured) criteria may comprise simply comparing a certain quantity or metric (e.g., remaining battery life or a location of tethering terminal device relative to the requesting terminal device) for candidate tethering terminal devices (i.e., here, first and second tethering terminal devices) to determine which tethering terminal device provides the best tethering connection (e.g., which tethering terminal device has the longest remaining battery life or which tethering terminal device is nearest to said terminal device to be tethered). In other embodiments, the evaluating based on the pre-defined criteria may correspond to calculating for each of the (candidate) tethering terminal devices a value of a quality metric defined to depend on multiple quantities or metrics defined in the tethering capability information. The quality metric may be defined, for example, as a weighted sum of multiple quantities defined in or derived from the tethering capability information. The determining in block 516 may also comprise comparing current strengths of candidate tethering cells (i.e., measured signal strengths for the candidate tethering cells).

In the illustrated example, the terminal device determines, in block 516, that the second tethering terminal device provides the optimal tethering cell for said terminal device. Consequently, the terminal device accepts, in message 517, the tethering offer of the second tethering cell. The accepting of the tethering offer may correspond to accessing the tethering cell.

Actions pertaining to block 516 may be carried out after receiving the tethering offers (messages 514, 515) as shown in FIG. 5. Alternatively, said actions may be carried out directly after acceptance message 511 is received, in parallel with blocks 512 and/or 513, as will be described in more detail in relation to FIG. 6.

After a pre-defined amount of time has passed since the setting up of the first tethering cell in block 512 without the terminal device accessing the first tethering cell, the first tethering terminal device terminates, in block 518 the first tethering cell and transmits, in message 519, information on the termination of the first tethering cell to the terminal device. Message 519 may be transmitted using any means discussed in relation to block 201 of FIG. 2 for transmitting tethering requests (e.g., as an SMS message). In some alternative embodiments, the transmitting of the information on the termination of the first tethering cell to the terminal device (i.e., message 519) and in some cases even the automated termination (block 309) may be omitted.

Figure 6:
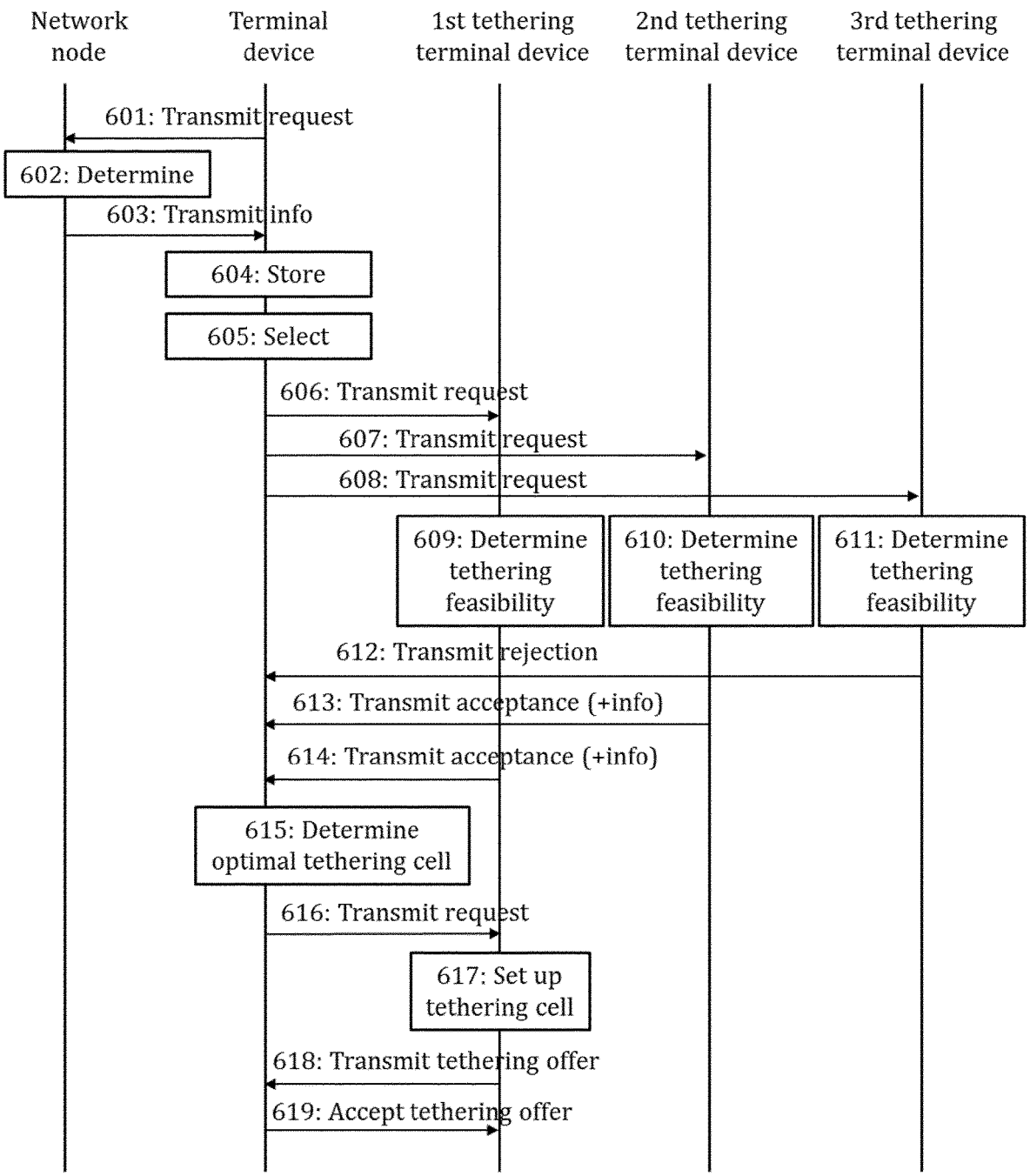

FIG. 6 shows another alternative signalling diagram illustrating a process for organizing tethering for a terminal device according to embodiments. FIG. 6 illustrates, similar to FIGS. 4 and 5, an exemplary scenario where a terminal device requests tethering from three tethering terminal devices (named first, second and third tethering terminal devices). The features described in relation to FIG. 6 may be applied equally to other tethering scenarios (i.e., tethering scenarios with any number of available tethering terminal devices). The terminal devices depicted in FIG. 6 may correspond to either of terminal devices 100, 102 of FIG. 1.

FIG. 6 illustrates an example of how information on tethering terminal devices (or specifically the information on the first set of one or more tethering terminal devices as described in relation to FIG. 2) may be acquired (or generated) by a terminal device (blocks 601 to 604). The functionalities described in relation to blocks 601 to 604 may be combined with any of the previous embodiments. Conversely, the functionalities described in relation to blocks 601 to 604 may be replaced in some alternative embodiments with either of block 401 of FIG. 4 and block 501 of FIG. 5 carried out by the terminal device.

Initially, the terminal device transmits, in message 601, a request for information on tethering terminal devices capable of setting up a tethering cell via at least one communications network to a network node. The network node may be, for example, an access node, a remote database or a remote database server. Said remote database or database server may be an Internet database or an Internet database server (possibly accessed by the terminal device via an access node). Said at least one communications network enabling communication with the network node may or may not be the same at least one communications network employed for communicating between the terminal device and the tethering terminal devices. The request in message 601 may comprise information on the current location of the terminal device. The current location of the terminal device may correspond, here, specifically to an area defined by a connected cell for a terminal device in connected mode, a RAN notification area for a terminal device in inactive mode, a camped tracking area for a terminal device in idle mode or a Global Positioning System (GPS) location reported by the terminal device to the network node.

In response to receiving the request, the network node determines, in block 602, a first set of one or more tethering terminal devices capable of tethering for the requesting terminal device. Specifically, the network node may determine the first set of one or more tethering terminal devices based on the current location of the terminal device (which may be included in the received request or may be known to the network node via other means). For example, the first set of one or more tethering terminal devices may be defined in the network node to contain all tethering terminal devices within a pre-defined distance from a location of the requesting terminal device, all tethering terminal devices within the same cell as the requesting terminal device or a pre-defined number of the tethering terminal devices closest to the requesting terminal device.

The network node transmits, in message 603, information on the first set of one or more tethering terminal devices via said at least one communications network to the terminal device. As described in relation to above embodiments, the information on the first set of one or more tethering terminal devices may comprise at least contact information (e.g., a phone number, an identifier comprising the phone number and/or an e-mail) enabling the terminal device to communicate with said tethering terminal device. Subsequently, the terminal device stores, in block 604, the information on the first set of one or more tethering terminal devices to the memory of the terminal device.

Blocks 605 to 611 of FIG. 6 may correspond, respectively, to blocks 402 to 408 of FIG. 4 or blocks 502 to 508 of FIG. 6 and are thus not discussed here for brevity.

Similar to embodiments illustrated in FIGS. 4 and 5, it is determined here also (in blocks 609 to 611) that the third tethering terminal device is not able to feasibly provide tethering for the terminal device while the first and second tethering terminal devices are. Thus, the third tethering terminal device transmits, in message 612, a rejection message over said at least one communications network to the terminal device (e.g., as an SMS message, an e-mail or a message of a dedicated messaging application or service). The first and second tethering terminal device transmit, in messages 613, 614, an acceptance message over said at least one communications network to the terminal device (e.g., as SMS messages, e-mails or messages of a dedicated messaging application or service). In this embodiment, each acceptance message may specifically comprise tethering capability information on a corresponding tethering terminal device. Said tethering capability information may be defined as described in relation to FIG. 5 (i.e., it may comprise, for example, information on a current charge of a battery, a current location and/or and capability). Additionally, each acceptance message may comprise tethering cell information (e.g., a carrier frequency used by a tethering cell and a cell identifier), as discussed in relation to FIG. 4.

In contrast to the above embodiments, in this embodiments the first and second tethering terminal devices which are feasibly able to provide tethering do not automatically set up tethering cells. Instead, following the transmission of the acceptance and/or rejection messages 612, 613, 614 from the tethering terminal devices, the terminal device determines, in block 615, an optimal tethering cell (for providing tethering for the terminal device) based on the tethering capability information transmitted in the acceptance messages 613, 614. The determining in block 615 may be carried out in a similar manner as described in relation to block 516 of FIG. 5.

Once an optimal tethering terminal device has been determined in block 615, the terminal device transmits, in message 616, a follow-up request for setting up a tethering cell over said at least one communications network to the optimal tethering terminal device (in the illustrated example, the first tethering terminal device). The follow-up request may also be transmitted as an SMS message, an e-mail or a message of a dedicated messaging application or service. In response to receiving said follow-up request, the optimal tethering terminal device (i.e., the first tethering terminal device) sets up, in block 617, the tethering cell and transmits (or broadcasts), in message 618, a tethering offer using the tethering cell to the terminal device. In response to receiving the tethering offer (potentially with the help of tethering cell information), the terminal device may transmit a message 619 accepting the tethering offer to the optimal tethering terminal device. Alternatively, the terminal device may indicate the acceptance of the tethering offer by accessing the tethering cell set up by the first tethering terminal device. Thus, in this embodiment, the initial tethering requests (i.e., messages 606, 607) serve merely as preliminary inquiries regarding the tethering opportunities with only the follow-up request triggering the setting up of the tethering cell. As no follow-up request is transmitted by the terminal device to the second terminal device, the second terminal device never sets up a tethering cell for the terminal device. In some embodiments, the terminal device may, instead, transmit to the second tethering terminal device via said at least one communications network a message (e.g., an SMS message, an e-mail or a message of a dedicated messaging application or service) informing the second tethering terminal device of the tethering request having been satisfied.

The embodiment illustrated in FIG. 6 has the benefit of allowing the terminal device to limit the search for the suitable tethering cell (i.e., limit the tethering cell discovery). The search for a tethering cell (carried out following message 616) may involve scanning different carrier frequencies and looking for a synchronization or beacon signal. As said scanning may be time- and energy-consuming, reducing the number of carrier frequencies to be scanned is beneficial for the efficient operation of the terminal device. As discussed above, each acceptance message 613, 614 may comprise information on the carrier frequency to be used for a corresponding tethering cell (i.e., the carrier frequency to be scanned in order to discover the tethering cell).

Figure 7:
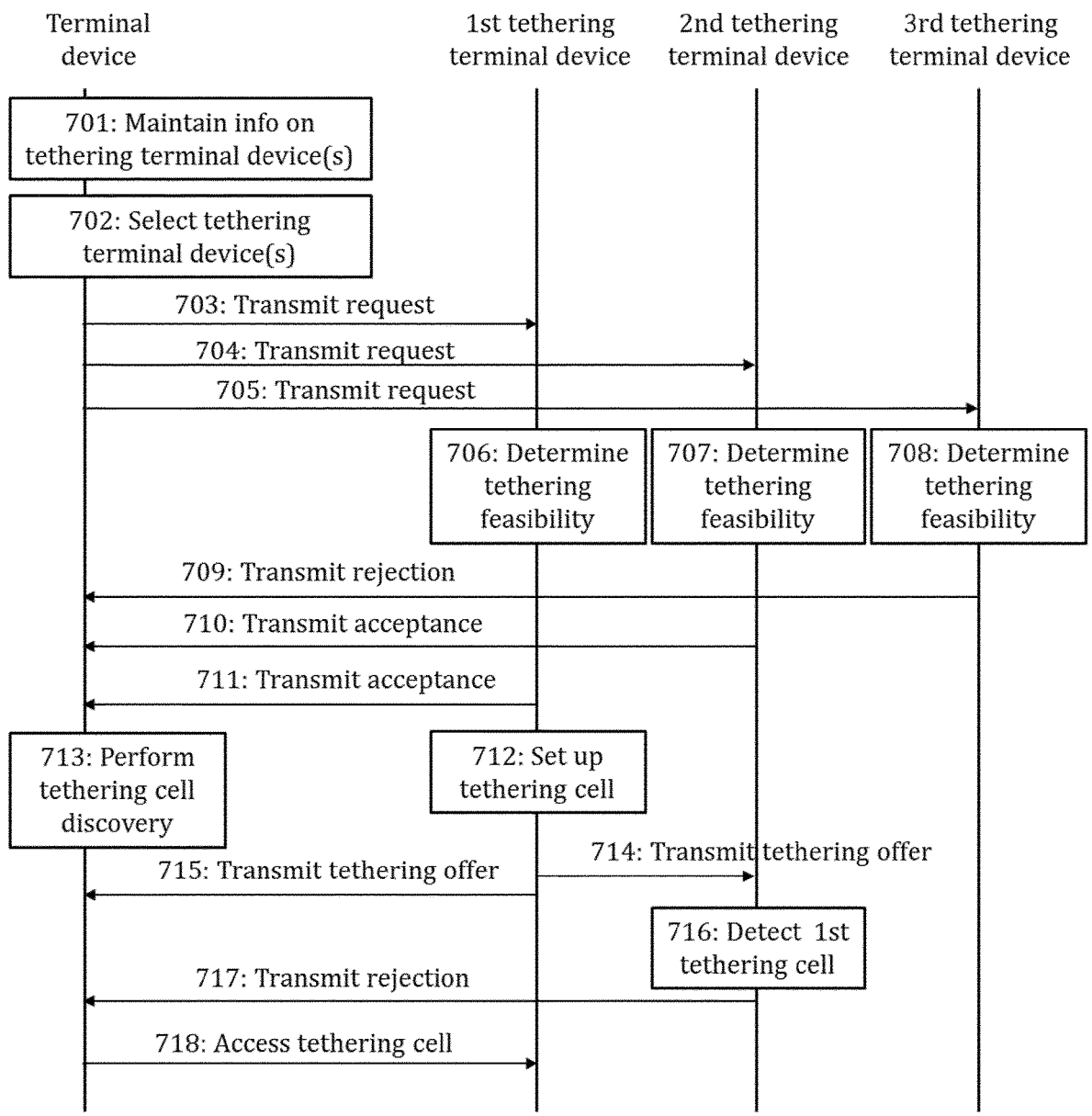

FIG. 7 shows another alternative signalling diagram illustrating a process for organizing tethering for a terminal device according to embodiments. Specifically, FIG. 7 illustrates a variation of the embodiment of FIG. 4. The embodiment illustrated in FIG. 7 corresponds for the most part to the embodiment of FIG. 4. Namely, blocks 701 to 711 of FIG. 7 may correspond, respectively, to blocks 401 to 411 of FIG. 4 (or equally blocks 501 to 511 of FIG. 5) and are thus not discussed here for brevity. Unless otherwise stated, any of functionalities described in relation to previous embodiment may be applied also for this embodiment.

In FIG. 7, it is assumed that the tethering requests 703 to 705 comprise at least an identifier for the tethering request. Moreover, it is assumed that the first tethering terminal device is able set up, in block 712, a first tethering cell before the second tethering terminal device is able to set up a second tethering cell. Upon setting up the first tethering cell in block 712, the first tethering terminal device starts transmitting (or specifically broadcasting) tethering offers using the first tethering cell. Here, the tethering offers comprise at least said identifier for the tethering request. Specifically, the first tethering terminal device not only transmits, in message 715, a tethering offer to the terminal device to be tethered but also transmits, in message 714, a tethering offer to the second tethering terminal device. Specifically, messages 714, 715 may be transmitted as broadcast messages (using the first tethering cell). Thus, the second tethering terminal device detects, in block 716, the first tethering cell by receiving the tethering offer from the first tethering device. As the tethering offer comprises the identifier for the tethering request, the second tethering terminal device is able to determine that the first tethering cell was set up for the terminal device in response to the same tethering request that the second tethering terminal device also received. As a tethering cell has already been established for the terminal device, the second tethering terminal device may, in this case, cancel setting up of a second tethering cell. Optionally, the second terminal device may transmit, in message 717, a reject message (e.g., an SMS message) to the terminal device informing the terminal device that no tethering cell will be established by the second tethering terminal device. The terminal device may receive the tethering offer 715 transmitted by the first tethering terminal device using the first tethering cell and consequently access, in message 718, the first tethering cell (similar to as described in relation to previous embodiments). It should be noted that the order of some of the elements 714 to 718 may be different in other embodiments. For example, the rejection message 717 may be transmitted after the terminal device accesses the first tethering cell in message 718.

The blocks, related functions, and information exchanges described above by means of FIGS. 2 to 7 are in no absolute chronological order, and some of them may be performed simultaneously or in an order differing from the given one.

Figure 8:
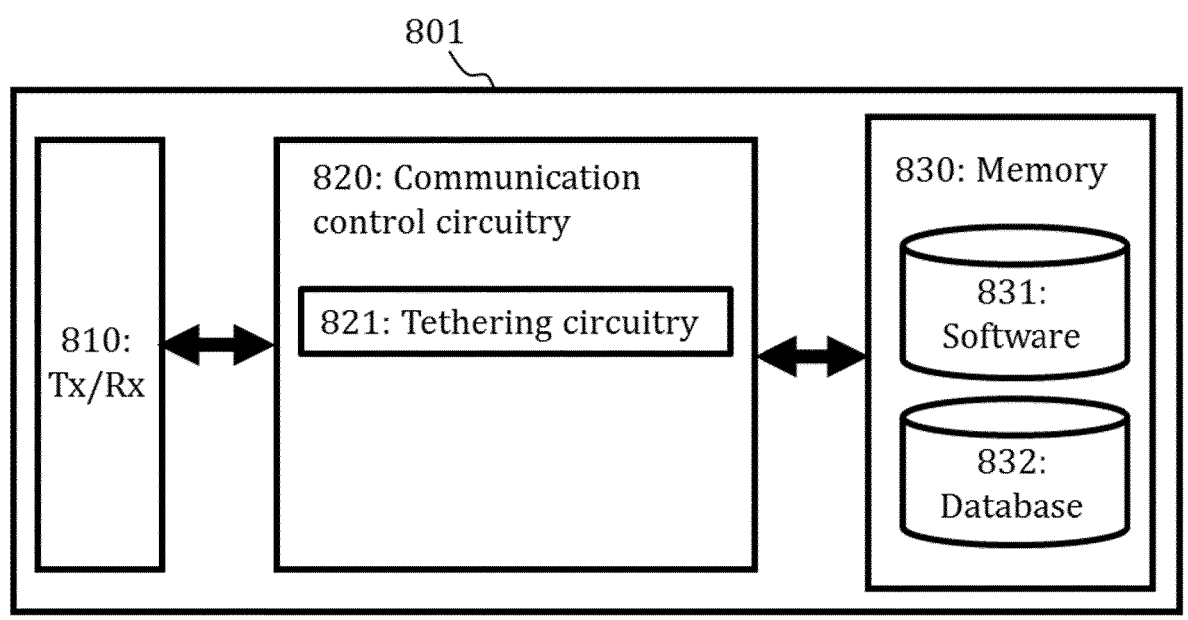
FIG. 8 illustrates an exemplary apparatus according to an embodiment.

FIG. 8 illustrates an exemplary apparatus 801 configured to carry out the functions described above in connection with a terminal device (requesting tethering) and/or with a tethering terminal device (providing tethering). The apparatus 801 may be an electronic device comprising electronic circuitries. The apparatus 801 may be powered by at least one battery (not shown in FIG. 8). The apparatus 801 may comprise a communication control circuitry 820 such as at least one processor, and at least one memory 830 including a computer program code (software) 831 wherein the at least one memory 830 and the computer program code (software) 831 are configured, with the at least one processor, to cause the apparatus to carry out any one of the embodiments of the terminal device and/or tethering terminal device described above.

The memory 830 may be implemented using any suitable data storage technology, such as semiconductor based memory devices, flash memory, magnetic memory devices and systems, optical memory devices and systems, fixed memory and removable memory. The memory may comprise information on a first set of one or more tethering terminal devices, a second set of one or more tethering terminal devices and/or location-specific tethering history information, as described in previous embodiments. The memory 830 may be connected to the communication control circuitry 820 via an interface.

The apparatus 801 may further comprise one or more communication interfaces (Tx/Rx) 810 comprising hardware and/or software for realizing communication connectivity according to one or more communication protocols. The one or more communication interfaces 810 may provide the apparatus 801 with communication capabilities to communicate in the cellular communication system and enable communication with network nodes and terminal devices, for example. Specifically, the one or more communication interfaces 810 may provide the apparatus 801 communication capabilities to communicate with one or more tethering terminal devices (i.e., one or more terminal devices providing tethering) and/or one or more terminal device requiring or requesting tethering. Further, the one or more communication interfaces 810 may provide the apparatus 801 communication capabilities to communicate with a remote server or a remote database (e.g., an Internet database). The one or more communication interfaces 810 may comprise standard well-known components such as an amplifier, filter, frequency-converter, (de)modulator, and encoder/decoder circuitries and one or more antennas.

Referring to FIG. 8, the communication control circuitry 820 may comprise at least tethering circuitry 821 configured to provide tethering to other terminal devices and/or to tether to tethering terminal devices (i.e., terminal devices capable of providing tethering). The tethering circuitry 821 may be configured to carry out at least some of the processes illustrated in any of FIGS. 2 to 5 and 7 and/or blocks/messages 604 to 619 of FIG. 6. In some embodiments, the tethering circuitry 821 may be configured to carry out only the functionalities described in relation to a (requesting) terminal or only the functionalities described in relation to a tethering terminal device.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

In an embodiment, at least some of the processes described in connection with FIGS. 2 to 7 may be carried out by an apparatus comprising corresponding means for carrying out at least some of the described processes. Some example means for carrying out the processes may include at least one of the following: detector, processor (including dual-core and multiple-core processors), microprocessor, digital signal processor (DSP), controller, micro-controller, receiver, transmitter, encoder, decoder, memory, RAM, ROM, software, firmware, display, user interface, display circuitry, user interface circuitry, user interface software, display software, circuit, antenna, antenna circuitry, application-specific integrated circuit (ASIC), digital signal processing device (DSPD), programmable logic device (PLD) and field programmable gate array (FPGA). For firmware or software, the implementations according embodiments may be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. In an embodiment, the at least one processor, the memory, and the computer program code form processing means or comprises one or more computer program code portions for carrying out one or more operations according to any one of the embodiments of FIGS. 2 to 7 or operations thereof.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A terminal device, comprising:
   at least one processor; and
   at least one memory including computer program code, the at least one memory and computer program code configured to, with the at least one processor, cause the terminal device to perform:
   transmitting a tethering request for setting up a tethering cell over at least one communications network to at least one tethering terminal device capable of setting up a tethering cell;
   performing tethering cell discovery for discovering tethering cells set up by any of said at least one tethering terminal device; and
   accessing, in response to discovering a tethering cell provided by a tethering terminal device of said at least one tethering terminal device, the tethering cell.

2. The terminal device according to claim 1, wherein the at least one memory and computer program code are further configured to cause the device to perform:
   maintaining, in a memory of the terminal device, information on a first set of one or more tethering terminal devices capable of setting up a tethering cell, wherein said information on the first set comprising, for each tethering terminal device in the first set, at least contact information enabling the terminal device to communicate with said tethering terminal device over said at least one communications network; and
   selecting, before the transmitting of the tethering request, said at least one tethering terminal device, at least in part, from the one or more tethering terminal devices in the first set, wherein the means are configured to generate the information on the first set of one or more tethering terminal devices by:
   transmitting a request for information on tethering terminal devices capable of setting up a tethering cell via said at least one communications network to a network node, wherein the request comprises at least information on a current location of the terminal device;
   receiving from the network node via said at least one communications network the information on the first set of one or more tethering terminal devices capable of setting up a tethering cell determined by the network node based on the current location of the terminal device; and
   storing the information on the first set of the one or more tethering terminal devices capable of setting up a tethering cell to the memory of the terminal device.

3. The terminal device according to claim 1, wherein the at least one memory and computer program code are further configured to cause the device to perform:
   maintaining, in a memory of the terminal device, information on a second set of one or more tethering terminal devices capable of setting up a tethering cell and configured to accept tethering requests from the terminal device, wherein said information on the second set comprises, for each tethering terminal device in the second set, at least contact information enabling the terminal device to communicate with said tethering terminal device over said at least one communications network; and selecting, before the transmitting of the tethering request, said at least one tethering terminal device, at least in part, from the one or more tethering terminal devices in the second set.

4. The terminal device according to claim 1, wherein the at least one memory and computer program code are further configured to cause the device to perform the tethering cell discovery in response to receiving an acceptance message from at least one of said at least one tethering terminal device, wherein each acceptance message comprises tethering cell information on one or more radio parameters to be used for tethering comprising at least one of a carrier frequency, a bandwidth and a cell identifier or information on how long a corresponding tethering cell is going to be active without the terminal device accessing it, the means being configured to perform the tethering cell discovery using the tethering cell information comprised in each received acceptance message, wherein each acceptance message is one of a short message service, SMS, message, an e-mail and a message of a dedicated messaging application.

5. The terminal device according to claim 1, wherein the at least one memory and computer program code are further configured to cause the device to transmit the tethering request as one of a short message service, SMS, message, an e-mail and a message of a dedicated messaging application or service.

6. The terminal device according to claim 1, wherein the tethering request comprises information on a current location of the terminal device for evaluating whether the terminal device is in range for tethering or configuration information for setting up a tethering cell.

7. The terminal device according to claim 1, wherein the at least one memory and computer program code are further configured to cause the device to perform the tethering cell discovery by:

receiving a tethering offer of at least one of said at least one tethering terminal device broadcast by said at least one of said at least one tethering terminal device using at least one corresponding tethering cell, wherein each tethering offer comprises tethering capability information of a corresponding tethering terminal device, the tethering capability information of each tethering terminal device comprising information on one or more of a current charge of a battery of a corresponding tethering terminal device, a battery charging state of the corresponding tethering terminal device, a location of the corresponding tethering terminal device, capability of the corresponding tethering terminal device and a current configuration of the tethering terminal device; and determining, in response to the receiving of the tethering offer of said at least one of said at least one tethering terminal device, an optimal tethering terminal device for providing tethering for the terminal device from said at least one of said at least one tethering terminal device by comparing the tethering capability information based on pre-defined criteria, wherein the accessing of the tethering cell comprises accessing a tethering cell provided by the optimal tethering terminal device.

8. A tethering terminal device, comprising:
at least one processor; and
at least one memory including computer program code, the at least one memory and computer program code configured to, with the at least one processor, cause the terminal device to perform:

determining, in response to receiving a tethering request over at least one communications network from a terminal device, based on the tethering request and a current state of the tethering terminal device whether tethering of the terminal device to the tethering terminal device is feasible; and setting up, in response to determining that tethering the terminal device is feasible, a tethering cell accessible by the terminal device.

9. The tethering terminal device according to claim 8, wherein the at least one memory and computer program code are further configured to cause the device to perform the determining whether tethering of the terminal device to the tethering terminal device is feasible by performing at least one of:

determining whether a current charge of a battery of the tethering terminal device allows for tethering;

determining whether the current location of the terminal device is within a pre-defined tethering range from a current location of the tethering terminal device, wherein information on the current location of the terminal device is comprised in the tethering request; and determining whether the tethering terminal device is currently being charged using a power supply.

10. The tethering terminal device according to claim 8, wherein the at least one memory and computer program code are further configured to cause the device to perform:

transmitting, in response to the determining that tethering to the terminal device is feasible, an acceptance message over said at least one communications network to the terminal device, wherein the acceptance message comprises tethering capability information of the tethering terminal device or tethering cell information of the tethering cell to be set up, the tethering capability information comprising information on one or more of a current charge of a battery of the tethering terminal device, a location of the tethering terminal device, capability of the tethering terminal device and current configuration of the tethering terminal device and the tethering cell information comprising information on one or more radio parameters to be used for tethering comprising at least one of a carrier frequency, a bandwidth and a cell identifier or information on how long the tethering cell is going to be active without the terminal device accessing it.

11. The tethering terminal device according to claim 10, wherein each of the tethering request or the acceptance message is one of a short message service, SMS, message, an e-mail and a message of a dedicated messaging application.

12. A method, comprising:

transmitting a tethering request for setting up a tethering cell over at least one communications network to at least one tethering terminal device capable of setting up a tethering cell;

performing tethering cell discovery for discovering tethering cells set up by any of said at least one tethering terminal device; and accessing, in response to discovering a tethering cell provided by a tethering terminal device of said at least one tethering terminal device, the tethering cell.

13. The method according to claim 12, further comprising:
   maintaining, in a memory of the terminal device, information on a first set of one or more tethering terminal devices capable of setting up a tethering cell, wherein said information on the first set comprising, for each tethering terminal device in the first set, at least contact information enabling the terminal device to communicate with said tethering terminal device over said at least one communications network; and
   selecting, before the transmitting of the tethering request, said at least one tethering terminal device, at least in part, from the one or more tethering terminal devices in the first set, wherein the means are configured to generate the information on the first set of one or more tethering terminal devices by:
   transmitting a request for information on tethering terminal devices capable of setting up a tethering cell via said at least one communications network to a network node, wherein the request comprises at least information on a current location of the terminal device;
   receiving from the network node via said at least one communications network the information on the first set of one or more tethering terminal devices capable of setting up a tethering cell determined by the network node based on the current location of the terminal device; and
   storing the information on the first set of the one or more tethering terminal devices capable of setting up a tethering cell to the memory of the terminal device.

14. The method according to claim 12, further comprising:
   maintaining, in a memory of the terminal device, information on a second set of one or more tethering terminal devices capable of setting up a tethering cell and configured to accept tethering requests from the terminal device, wherein said information on the second set comprises, for each tethering terminal device in the second set, at least contact information enabling the terminal device to communicate with said tethering terminal device over said at least one communications network; and
   selecting, before the transmitting of the tethering request, said at least one tethering terminal device, at least in part, from the one or more tethering terminal devices in the second set.

15. The method according to claim 12, further comprising performing the tethering cell discovery in response to receiving an acceptance message from at least one of said at least one tethering terminal device, wherein each acceptance message comprises tethering cell information on one or more radio parameters to be used for tethering comprising at least one of a carrier frequency, a bandwidth and a cell identifier or information on how long a corresponding tethering cell is going to be active without the terminal device accessing it, the means being configured to perform the tethering cell discovery using the tethering cell information comprised in each received acceptance message, wherein each acceptance message is one of a short message service, SMS, message, an e-mail and a message of a dedicated messaging application.

16. The method according to claim 12, further comprising causing the device to transmit the tethering request as one of a short message service, SMS, message, an e-mail and a message of a dedicated messaging application or service.

17. The terminal device according to claim 12, wherein the tethering request comprises information on a current location of the terminal device for evaluating whether the terminal device is in range for tethering or configuration information for setting up a tethering cell.

18. The terminal device according to claim 12, further comprising causing the device to perform the tethering cell discovery by:
   receiving a tethering offer of at least one of said at least one tethering terminal device broadcast by said at least one of said at least one tethering terminal device using at least one corresponding tethering cell, wherein each tethering offer comprises tethering capability information of a corresponding tethering terminal device, the tethering capability information of each tethering terminal device comprising information on one or more of a current charge of a battery of a corresponding tethering terminal device, a battery charging state of the corresponding tethering terminal device, a location of the corresponding tethering terminal device, capability of the corresponding tethering terminal device and a current configuration of the tethering terminal device; and
   determining, in response to the receiving of the tethering offer of said at least one of said at least one tethering terminal device, an optimal tethering terminal device for providing tethering for the terminal device from said at least one of said at least one tethering terminal device by comparing the tethering capability information based on pre-defined criteria, wherein the accessing of the tethering cell comprises accessing a tethering cell provided by the optimal tethering terminal device.

19. A method, comprising:
   determining, in response to receiving a tethering request over at least one communications network from a terminal device, based on the tethering request and a current state of the tethering terminal device whether tethering of the terminal device to the tethering terminal device is feasible; and
   setting up, in response to determining that tethering the terminal device is feasible, a tethering cell accessible by the terminal device.

* * * * *